April 6, 1965   D. W. CHAMBERLIN   3,176,826
FRUIT PREPARATION MACHINE
Filed Feb. 21, 1962   8 Sheets-Sheet 5
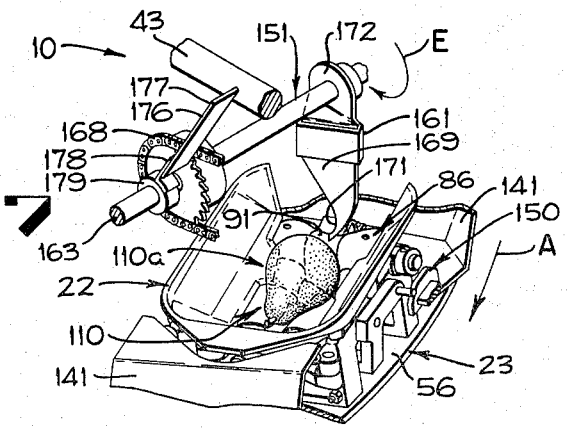
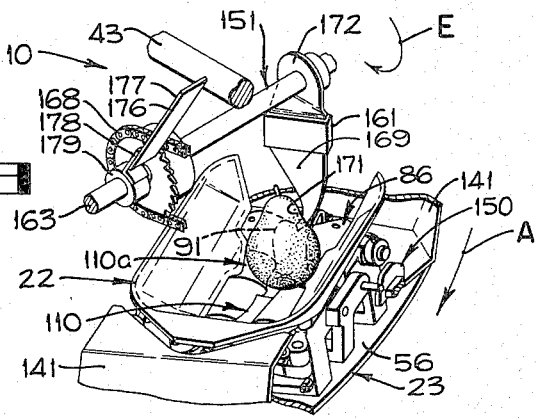
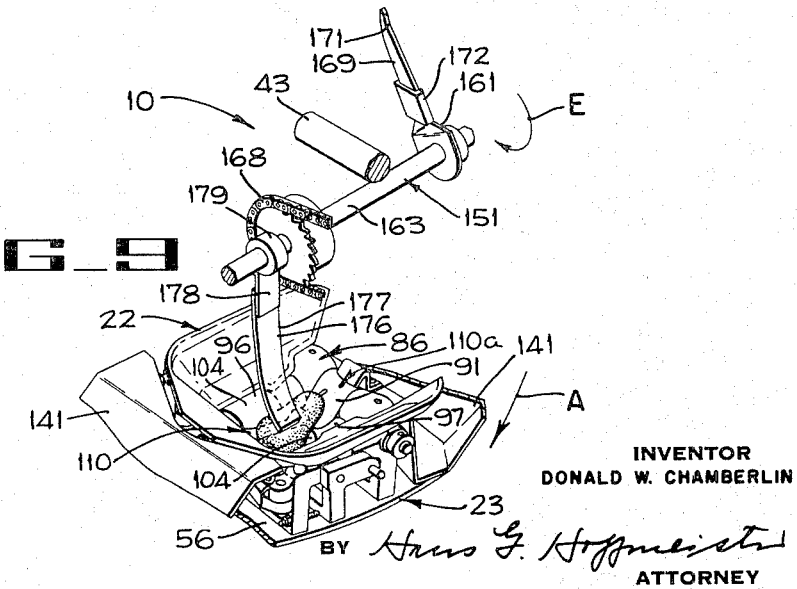
INVENTOR
DONALD W. CHAMBERLIN
BY
ATTORNEY

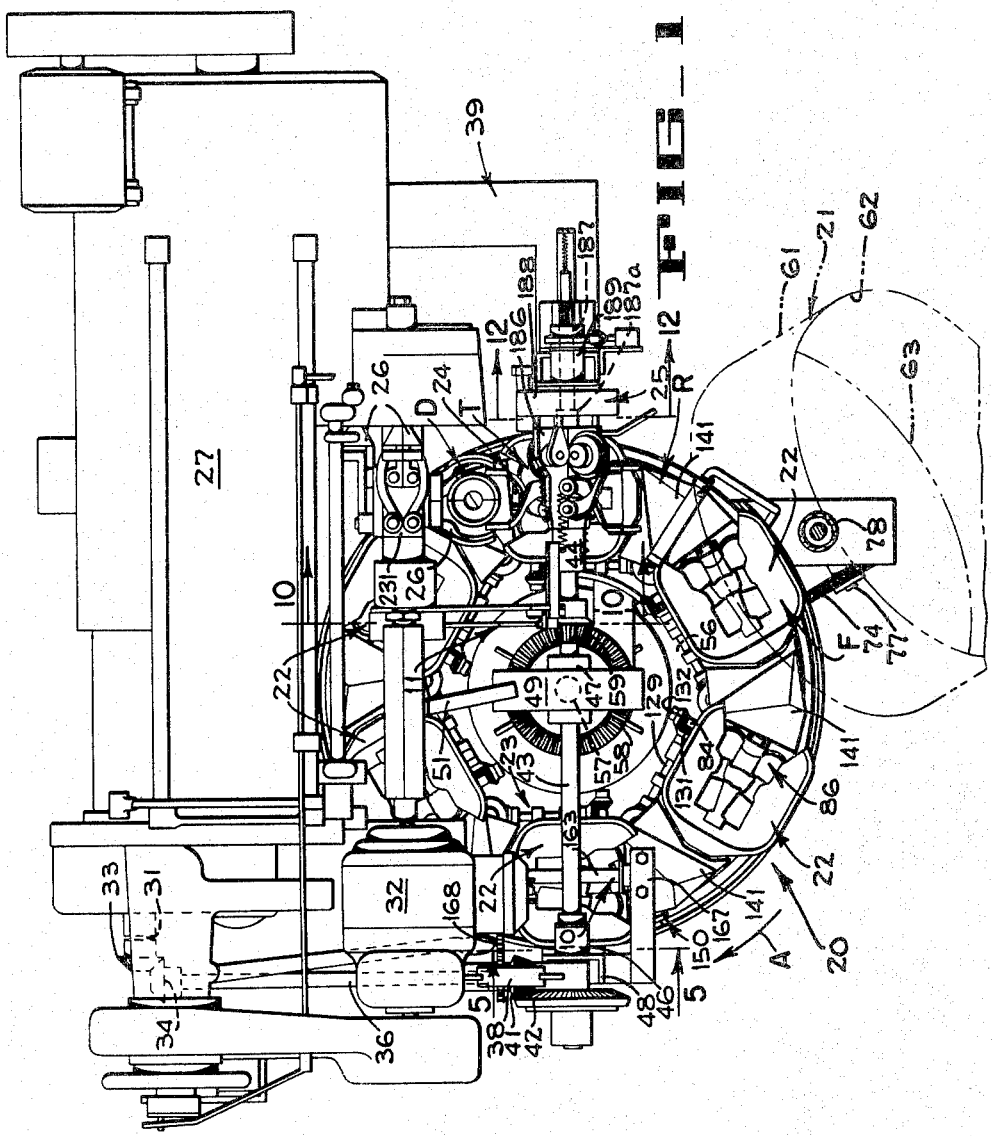

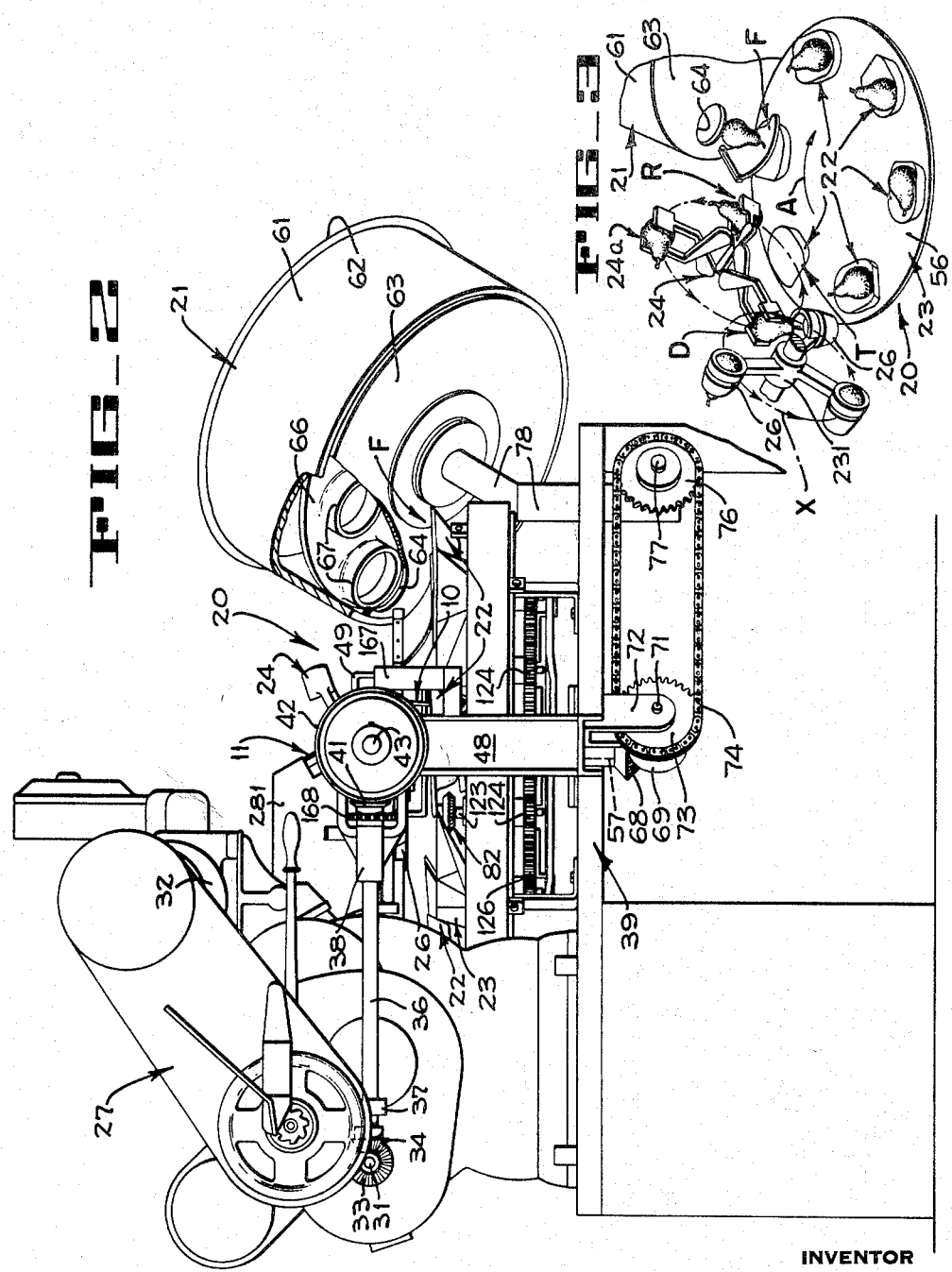

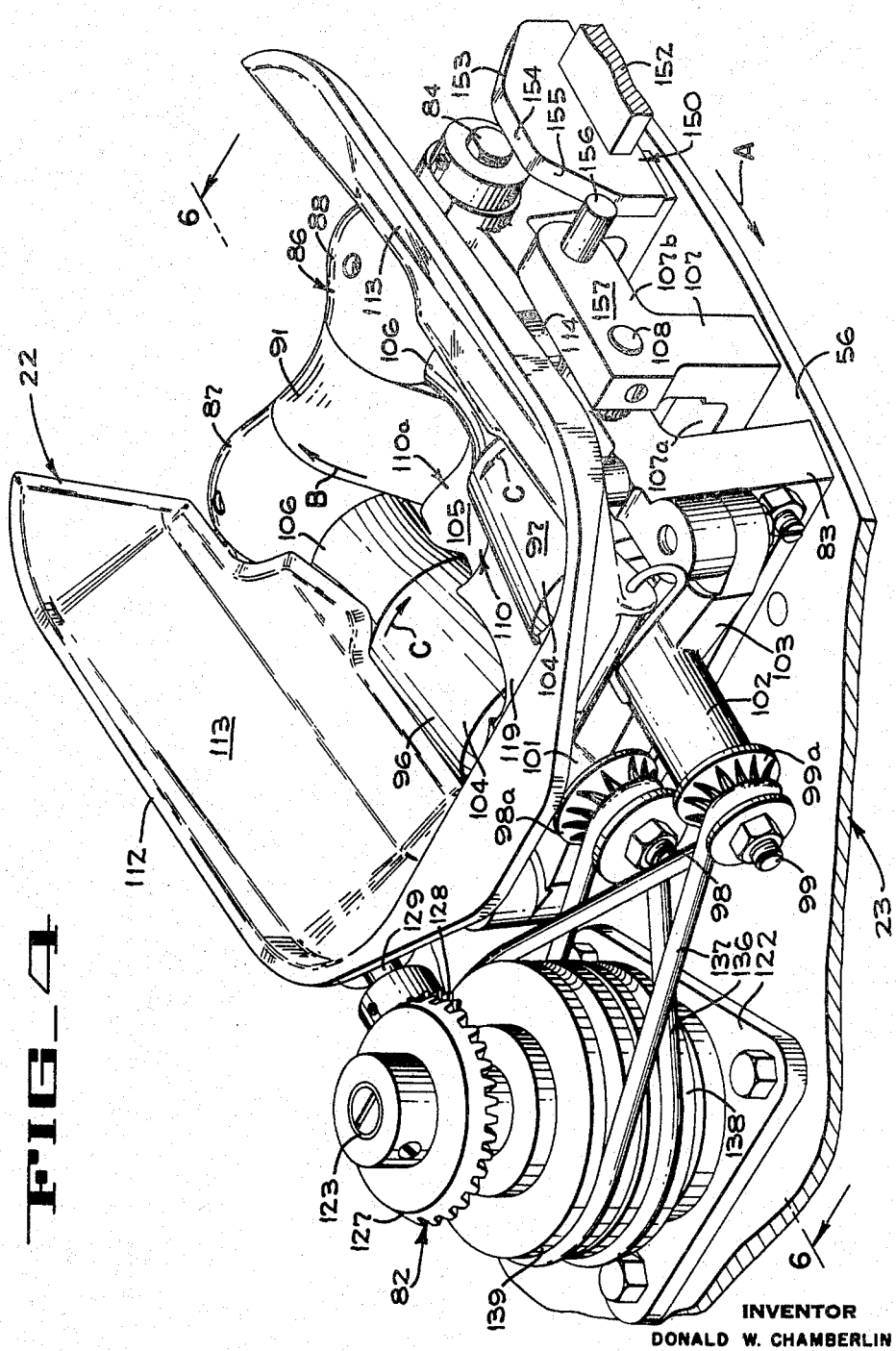

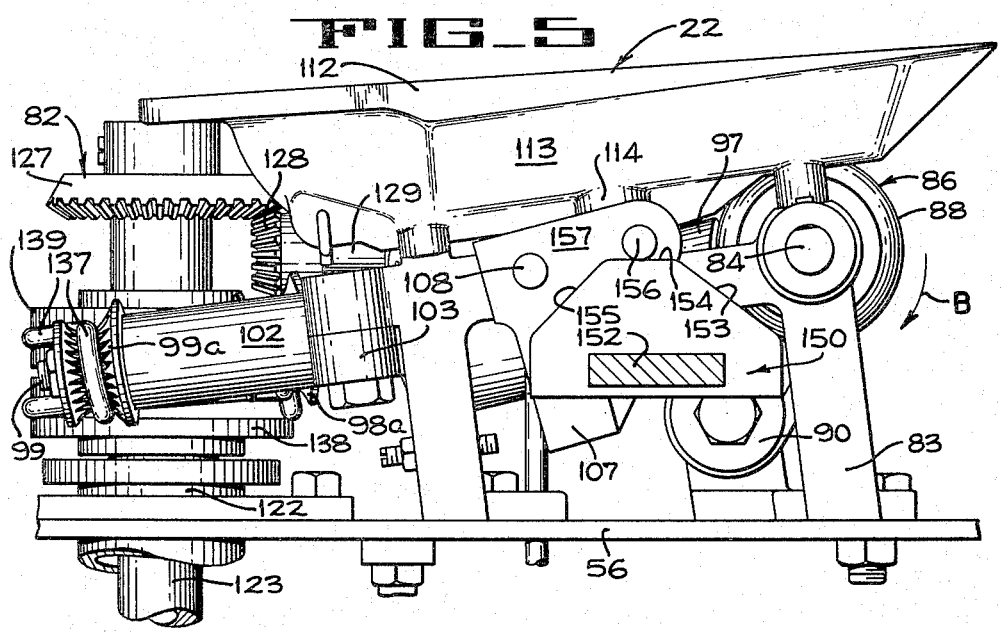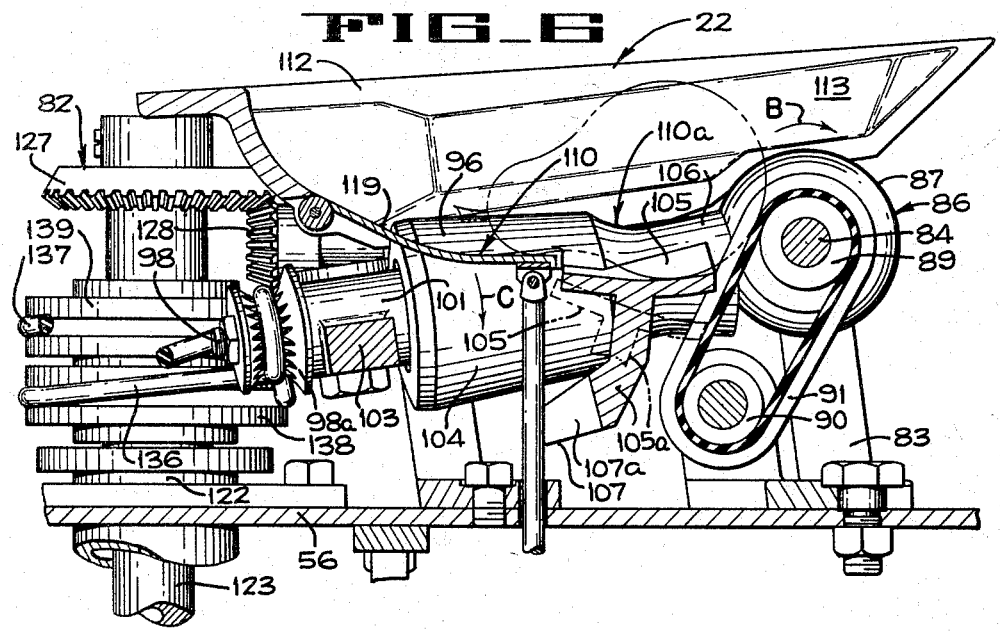

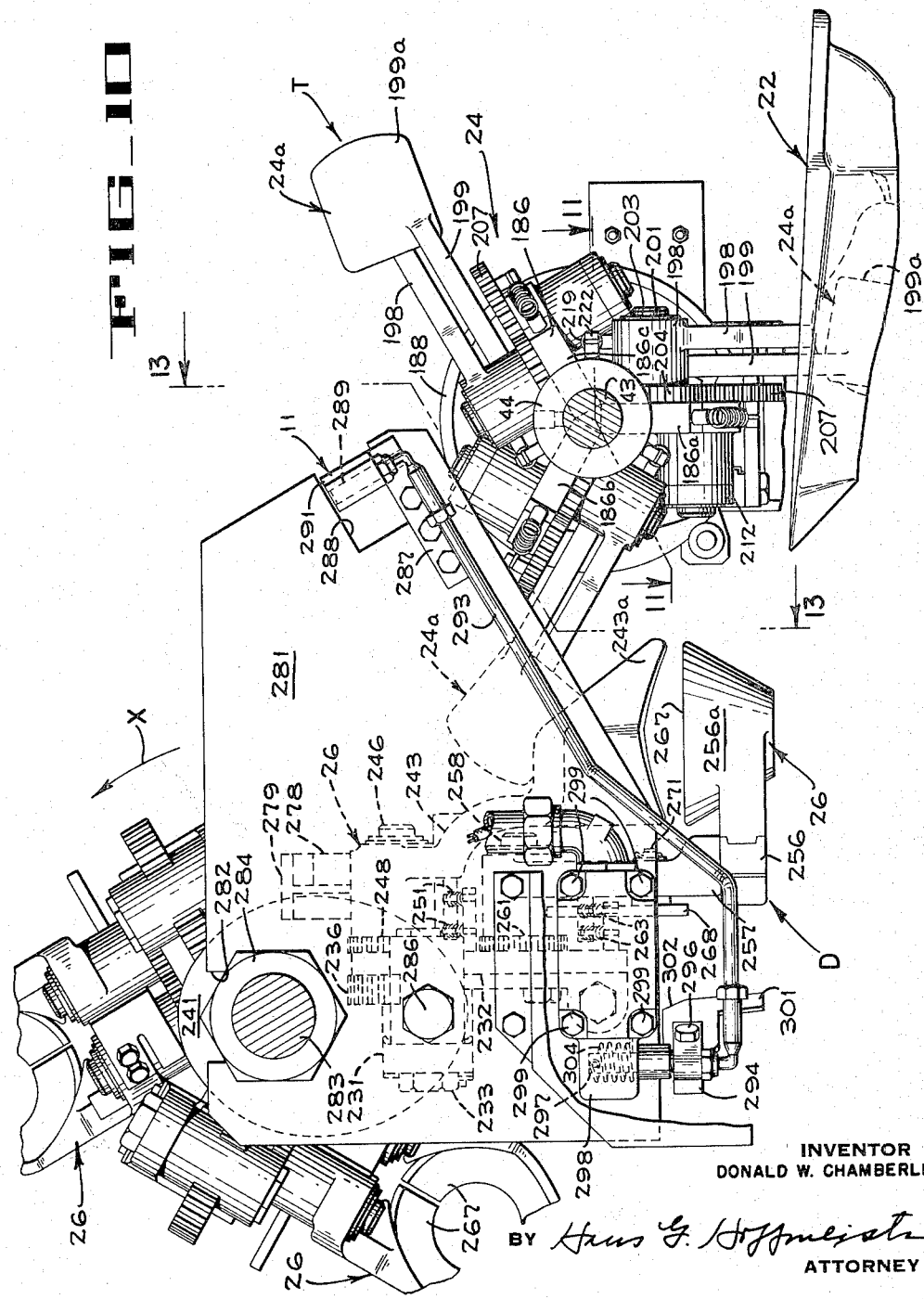

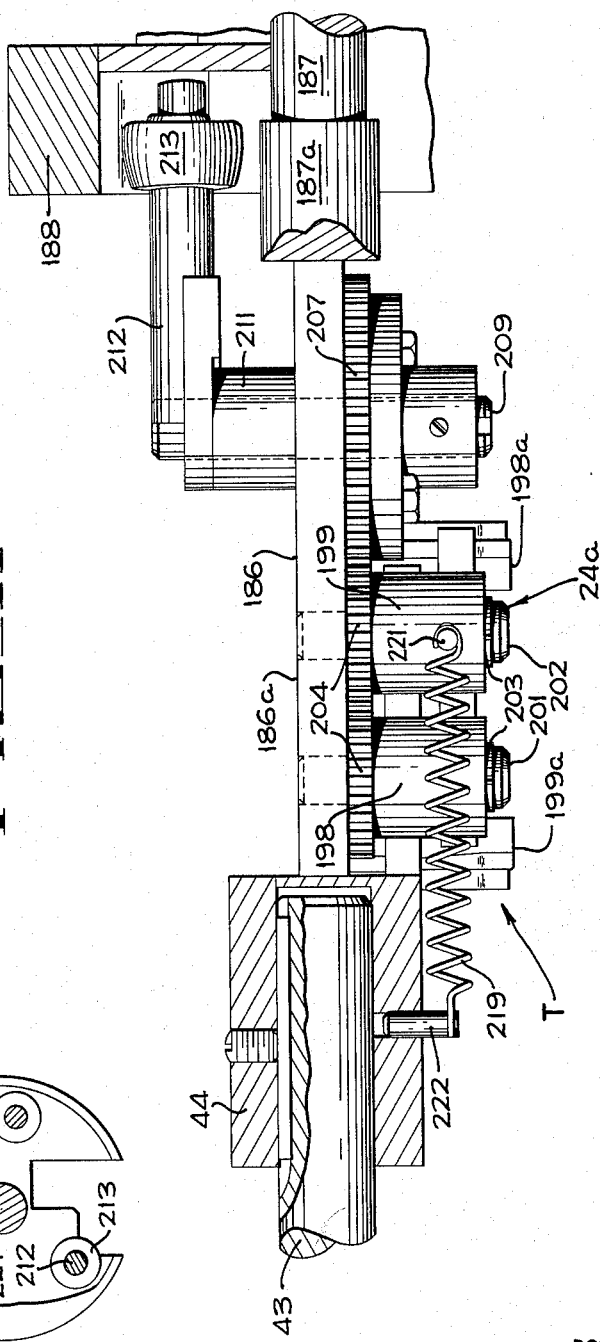

April 6, 1965   D. W. CHAMBERLIN   3,176,826
FRUIT PREPARATION MACHINE
Filed Feb. 21, 1962   8 Sheets-Sheet 8
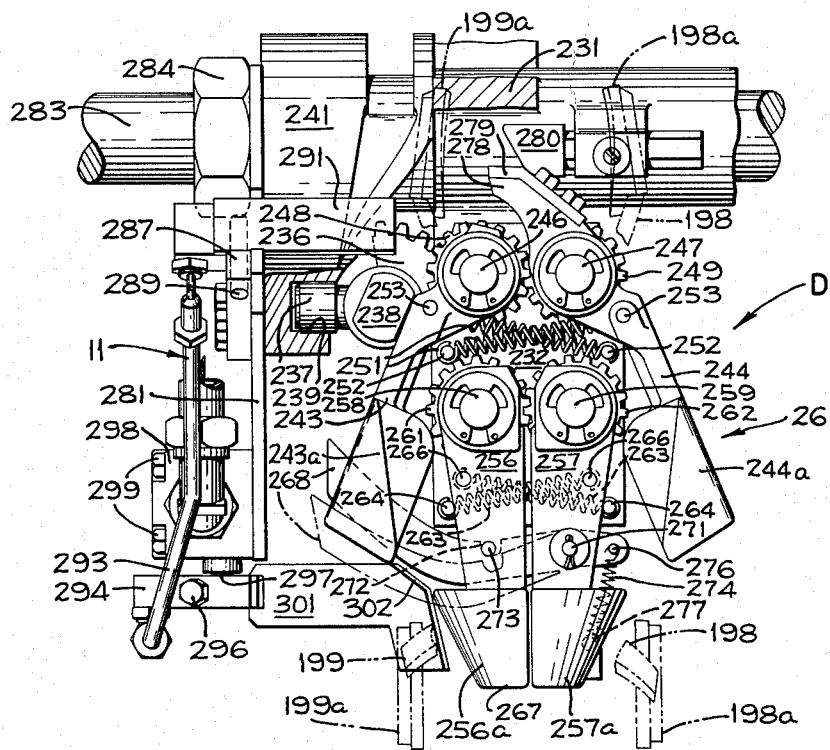
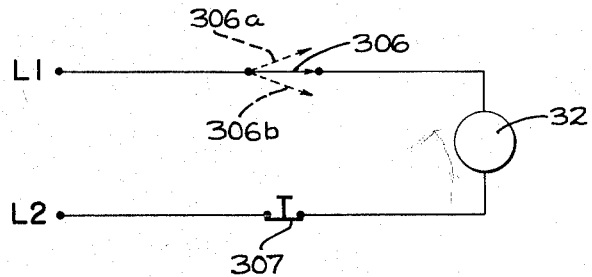
INVENTOR
DONALD W. CHAMBERLIN
BY *Hans G. Hoffmichen*
ATTORNEY United States Patent Office 3,176,826
Patented Apr. 6, 1965

3,176,826
FRUIT PREPARATION MACHINE
Donald W. Chamberlin, Los Gatos, Calif., assignor to FMC Corporation, San Jose, Calif., a corporation of Delaware
Filed Feb. 21, 1962, Ser. No. 174,909
13 Claims. (Cl. 198—33)

The present invention pertains to fruit preparation machines and more particularly relates to apparatus for orienting and feeding fruit such as pears to individual processing cups, and to apparatus for detecting the presence of mispositioned parts which are apt to collide and to interrupt the operation of the machine upon such detection.

In pear orienting and feeding apparatus of the type disclosed in the pending application of Chamberlin, Ser. No. 144,153, which is assigned to the assignee of the present invention, orienting mechanisms with a plurality of moving pear supporting surfaces are provided for rolling the pear about different axes so as to orient one pear at a time. A transfer mechanism then removes the oriented pears from the orienting mechanisms and places these pears individually into one of three cups of a pear preparation machine for further processing.

It has been discovered that certain parts of the transfer mechanisms are sometimes spread to such an extent, by unusually large pears or as a result of engaging the ends rather than the sides of pears, that parts of the transfer mechanism are apt to collide or interfere with parts of the cups of the pear preparation machine, resulting in breakage of the transfer mechanism. Similarly, certain parts of the cups may be actuated to such an extent as to interfere with normally positioned parts of the transfer mechanism, thereby causing mechanical interference of the parts.

It is, therefore, one object of the present invention to provide an improved apparatus for orienting and feeding oriented pears to a fruit preparation machine.

Another object is to provide apparatus for altering the position of a pear in an orienting mechanism.

Another object is to provide means for stopping the machine in the event the transfer mechanism or the pear receiving cups are improperly positioned.

These and other objects and advantages of the present invention will become apparent from the following description and the accompanying drawings, in which:

FIGURE 1 is a plan of a pear preparation machine coupled to the improved pear orienting and feeding apparatus of the present invention, certain parts being shown in phantom.

FIGURE 2 is an elevation of the left end of the machine of FIGURE 1, certain parts being broken away.

FIGURE 3 is a diagrammatic perspective showing the cooperative relationship between certain rotary parts of the pear orienting and feeding apparatus and certain parts of the pear preparation machine.

FIGURE 4 is an enlarged perspective showing one of the pear orienting mechanisms.

FIGURE 5 is a side elevation, with parts in section, of one of the pear orienting mechanisms looking in the general direction of the arrow 5—5 of FIGURE 1.

FIGURE 6 is a central vertical sectional view of the orienting mechanism of FIGURE 5 taken along line 6—6 of FIGURE 4, with the bridge shown cammed to its uppermost position.

FIGURE 7 is a perspective of the pear shifting apparatus of the present invention, particularly showing a wiper, adapted to engage the stem end of misaligned pears, moving past the blossom end of a properly oriented pear.

FIGURE 8 is a perspective, similar to FIGURE 7, showing the wiper engaging and flipping the stem end of a pear which has not been oriented by the time it reaches this station.

FIGURE 9 is a perspective similar to FIGURE 7, but showing a second wiper of the pear shifting apparatus of the present invention engaging the blossom end of a pear that has not been oriented.

FIGURE 10 is an enlarged section taken along line 10—10 of FIGURE 1 and showing the adverse-condition detector.

FIGURE 11 is an enlarged horizontal section taken along line 11—11 of FIGURE 10 showing the mounting structure for the transfer mechanism.

FIGURE 12 is a vertical section taken along line 12—12 of FIGURE 1 showing a barrel cam for operating the transfer mechanism.

FIGURE 13 is a front elevation of a fruit supporting cup and the adverse-condition detector, taken generally along the line 13—13 of FIGURE 10 and showing a portion of the transfer mechanism in phantom lines.

FIGURE 14 is a wiring diagram of a portion of the control circuit used with the present machine.

The position-altering apparatus 10 (FIGS. 7, 8 and 9) and the adverse-condition detector 11 (FIGS. 10 and 13) of the present invention is associated with a pear orienting and feeding apparatus 20 (FIGS. 1, 2 and 3) which receives pears at a feed station F from a well known pear feeder 21 which deposits pears one at a time into a plurality of equally spaced orienting mechanisms 22. The orienting mechanisms 22 are mounted on a carrier or turret 23 which is continuously driven in the direction of the arrow A in FIGURES 1 and 3. As the turret moves in a circular path in the direction of arrow A, each pear in its respective orienting mechanism 22 is oriented so that the stem end is disposed foremost and the stem blossom axis is generally tangent to the circular path of movement of the pear. After the pear is oriented, it is carried to a transfer station T (FIGURE 3) where jaw units 24a of a transfer mechanism 24 grips each pear independently and removes it from its orienting mechanism 22. The transfer mechanism 24 cooperates with a reject mechanism 25 (FIG. 1) and carries the oriented pears past a reject station R. All unoriented pears are discharged from the transfer mechanism at the reject station R, and the remaining properly oriented pears are carried backward by the transfer mechanism to a discharge station D. At the discharge station, each oriented pear is released from the transfer mechanism 24 and is deposited stem end down into one of three fruit supporting cups 26 (FIG. 3) of a pear preparation machine 27 of well known design, which is arranged to peel, core and perform other desired operations on the pears. The cups 26 are intermittently driven and, during operation, are stopped one by one at the discharge station D of the transfer mechanism.

The pear preparation machine 27 may be of the type disclosed in the United States Letters Patent No. 2,905,216 which issued to M. E. C. Freeman et al. on September 22, 1959. Also, the construction and operation of the pear feeder 21, the orienting apparatus 20, the driving apparatus, and the associated mechanisms are described in the afore-mentioned Chamberlin application Ser. No. 144,153. Reference may be had to the Freeman et al. patent and the Chamberlin application for the details of any structure not discussed in detail hereinafter.

The drive for the turret 23, the transfer mechanism 24 and the pear feeder 21 includes a shaft 31 (FIGS. 1 and 2) of the pear preparation machine 27 which is continuously driven by the motor 32 by internal drive parts (not shown). A bevel gear 33 keyed to the shaft 31 drives a bevel gear 34 which is keyed to one end of a shaft 36.

The shaft 36 is suitably journalled in brackets 37 and 38 (FIG. 2) which are secured to the machine 27 and to a rigid support frame 39 of the orienting and feeding apparatus 20, respectively.

A bevel gear 41 is keyed to the other end of the shaft 36 and meshes with a large diameter bevel gear 42 which is secured to one end of a shaft 43 that extends radially of the turret 23, as best shown in FIG. 1. The shaft 43 has one end journalled in a bearing 46, and an intermediate portion journalled in a central block 47. The other end of the shaft 43 is received in and is secured to a hub 44 of the transfer mechanism 24. The bearing 46 is secured to the upper end of a vertically extending channel 48 of the frame 39, and the block 47 is bolted to a looped support bracket 49 (FIGS. 1 and 2) which is secured to a fixed member of the pear preparation machine 27 by a strap 51.

The turret 23 includes a large diameter horizontal disc 56 which is secured to a vertically extending turret shaft 57 (FIG. 1) journalled in the frame 39. A bevel gear 58 is keyed to the upper end of the shaft 57 and meshes with a bevel gear 59 that is keyed to the shaft 43. Thus, rotation of the shaft 43 causes rotation of the turret 23 through the gears 58 and 59.

The pear feeder 21 (FIG. 2) comprises a stationary inclined cylinder 61 having an open inlet end 62 and an inclined floor 63 which has a single discharge opening 64 near its upper end. A false floor 66, having a plurality of tubular fruit receiving pockets 67 formed adjacent its periphery, is mounted for rotation within the cylinder 61. The false floor 66 is driven from a bevel gear 68, keyed to the lower end of the turret shaft 57, that is in driving engagement with a bevel gear 69. The bevel gear 69 is keyed to a shaft 71 that is journalled in a yoke 72 secured to the frame 39. A drive sprocket 73 keyed to the shaft 71 is connected by a chain 74 to a driven sprocket 76 which is keyed to a stub shaft 77. The stub shaft 77 is journalled in a stationary tubular housing 78 which is secured to the frame 39 and to the floor 63 to support the pear feeder 21 in its inclined position. Certain drive parts (not shown) are positioned within the tubular housing 78 and connect the stub shaft 77 in driving engagement with the false floor 66.

Rotation of the false floor 66 causes pears, which are fed into the cylinder 61 in bulk from a conveyor (not shown), to be individually picked up in the pockets 67. The pockets carry the pears upwardly until they reach the discharge opening 64 at which time the pears individually fall through the opening 64 into one of the orienting mechanisms 22 therebelow.

It will be understood that the above drive mechanisms for the turret 23, the pear feeder 21, the transfer mechanism 24, and the fruit supporting cups 26 are timed so that one of the fruit receiving pockets 67 registers with the opening 64 when one of the orienting mechanisms 22 is in position to receive a pear from the feeder 21. Also, the movement of the orienting mechanism 22 and the fruit supporting cups 26 are timed with the movement of the transfer mechanism 24 so that the mechanism 24 can effect a transfer of the oriented pear from each of the orienting mechanisms 22 to the cups 26.

Six equally spaced orienting mechanisms 22 (FIG. 1) are provided and are bolted to the turret disc 56, and each mechanism 22 has a transmission 82 (FIGS. 4, 5 and 6) associated therewith that is likewise bolted to the disc 56. Since all the orienting mechanisms 22 and their transmissions 82 are identical, the description of one of each of these units will suffice for all.

Each orienting mechanism 22 comprises a frame 83 which rotatably supports a transversely extending rear orienting roller shaft 84. A rear roller 86 is constructed in two halves comprising two identical spaced bulbous end portions 87 and 88 of generally truncated spherical form, and two inner end portions which define a cylindrical belt drive roller 89 (FIG. 6). The two halves of the rear roller 86 are rigidly secured to the shaft 84. An upwardly and rearwardly inclined orienting belt 91 of concave transverse section is trained around the inner portions of the rear roller 86 and around an idler roller 90 which is journalled in the frame 83.

Two side orienting rollers 96 and 97 (FIG. 4) are mounted on shafts 98 and 99, respectively, which are journalled in elongated bushings 101 and 102, respectively. The bushings 101 and 102, are formed as an integral part of a bracket 103 which extends transversely across and is bolted to the forward end of the frame 83. The axes of the shafts 98 and 99 converge toward the forward end of the orienting mechanism 22 and are inclined forwardly and downwardly from the rear shaft 84. Each side roller 96 and 97 includes a frusto-conical forward portion 104 and a concave rear portion 106 which conforms to the shape of the blossom end of an average pear. A bridge 105 is disposed between the rollers and has a downwardly extending portion 105a (FIG. 6) connected to a transverse bar 107a (FIG. 4) of a U-shaped bracket 107 which pivots on a pin 108 and has a bellcrank 107b formed on one end. The side edges of the bridge 105 conform to the shape of the rear portions of the rollers 96 and 97 and lie closely adjacent thereto. The rear edge of the bridge 105 lies closely adjacent the orienting belt 91. The end faces of the rearward ends of the side rollers 96 and 97 are concave so as to permit a portion of the bulbous ends 87 and 88, respectively, of the rear roller 86 to pass therethrough. In this way, the clearance between the ends of the rollers 96 and 97 and the bulbous ends 87 and 88 is reduced to a minimum. The forward ends of the shafts 98 and 99 are shouldered and threaded to receive pulleys 98a and 99a, respectively, said pulleys being locked in place on the shafts by nuts.

An aligning cavity 110 is formed between the rollers 96 and 97 and the slope of the roller portions 104 and the angle of divergence of the rollers is such that the fruit will be drawn into the aligning cavity 110 upon rotation of the rollers and belt 91 in the directions indicated by the arrows B and C (FIGS. 4 and 6). The concave roller portions 106 are so curved relative to the frusto-conical roller portions 104 that a generally spherical fruit receiving chamber 110a is defined by the two concave roller portions 106 and the belt 91.

The orienting mechanism 22 also includes a fruit receiving U-shaped dish 112 which is contoured to aid feeding and to permit freedom of fruit movement during the orienting operation. Each side wall 113 of the dish 112 is provided with a downwardly projecting threaded boss 114 (only one being shown in FIG. 4) which rests on and is secured to the frame 83 by a capscrew (not shown). The rear of the dish 112 is open for reasons which will be explained presently. The bottom of the dish is also open to expose the rollers and belt, and the side walls 113 are shaped to deflect the pear inwardly toward the aligning cavity 110.

A nose stop 119 (FIGS. 4 and 6) is mounted between the frusto-conical forward portions 104 of the side rollers 96 and 97 and supports the nose of an aligned pear.

The rear orienting roller 86 and the orienting belt 91 are continuously driven in the direction of the arrow B, and the side orienting rollers 96 and 97 are driven either together or separately in the directions of the arrows C by the transmission 82. The transmission 82 includes a flanged bearing housing 122 within which is journalled a vertically extending shaft 123. A pinion 124 (FIG. 2) is keyed to the lower end of the shaft 123 and meshes with a large diameter gear 126 which is fixed to the frame 39 and is concentric with the axis of the turret 23. A bevel gear 127 (FIG. 4) secured to the upper end of the shaft 123 drives a gear 128 which is secured to a shaft 129. The shaft 129 (FIG. 1) is journalled in the frame 83 of the orienting mechanism 22 and is connected in driving engagement to the rear orienting roller shaft 84 by bevel gears 131 and 132. Thus, rotation of the turret 23 will cause continuous rotation of the rear orienting roller 86 (FIG. 4) and belt 91 in the direction of the arrow B.

The side orienting rollers 96 and 97 are driven by belts 136 and 137 (FIG. 4). The belt 136 is trained around the pulley 98a and around a drive sheave 138 of the transmission 82. Similarly, the belt 137 is trained around the pulley 99a and around a drive sheave 139 of the transmission. Certain internal parts (not shown) of the transmission 82 are arranged either to simultaneously connect both sheaves 138 and 139 to the shaft 123 or to connect one sheave at a time to the shaft 123. Accordingly, the side orienting rollers 96 and 97 are driven either together or separately in the direction of the arrows C by the transmission 82.

The rotation of the orienting rollers 86, 96 and 97 and the movement of the orienting belt 91 causes a normally shaped pear in the orienting mechanism 22 to be shifted and rotated until the pear becomes aligned in the cavity 110 with its stem end foremost and its bulbous blossom end received in the spherical chamber 110a. Discharge chutes 141 (FIGS. 7, 8 and 9) are disposed between each of the orienting mechanisms 22 and act to guide pears received therein outwardly of the turret 23.

The portion of the pear orienting and feeding apparatus 20 thus far described is the same as that disclosed in the aforementioned Chamberlin application and is believed to be sufficient for an understanding of the operation of the position—altering apparatus 10 and the adverse-condition detector 11 of the present invention.

Although the above described orienting mechanism 22 properly orients most pears, certain pears, such as pears which are unusually long and thin sometime avoid orientation. Accordingly the position-altering apparatus 10 (FIGURES 7, 8 and 9) of the present invention includes a stationary cam 150 and a rotary wiping unit 151 which are effective to displace pears, which avoid orientation, sufficiently to cause their subsequent orientation by the associated orienting mechanism 22.

The cam 150 is fixed to the frame 39 of the pear orienting and feeding apparatus 20, in the position shown in FIGURE 1, by a bracket 152 (FIG. 4). The cam 150 includes an upwardly inclined portion 153, a horizontal portion 154, and a downwardly inclined portion 155. As the pear orienting unit 22 moves past the cam 150, a pin 156 secured to a rearward extension 157 of the bellcrank 107b of the U-shaped bracket 107 engages the cam 150, causing the bracket 107 to pivot to move the bridge 105 from the dotted line position (FIG. 6) to the solid line position. In this way, a pear supported on the bridge 105 will be abruptly raised and lowered thereby disturbing an unoriented pear sufficiently to permit the belt 91 and the rollers 86, 96 and 97 to subsequently orient the pear.

The rotary wiping unit 151 is positioned on the downstream side of the cam 150 and includes a stem end engaging member 161 which cooperates with the cam-actuated bridge 105 to transversely flip those pears which are substantially 180° out of alignment shortly after the bridge has been actuated by the cam 150 to jostle the unoriented pear. All pears which have their stem ends projecting rearwardly over the belt 91 or over the rear orienting roller 86 as indicated in FIG. 8, will be considered as being 180° out of alignment and these misaligned pears are the ones that are the particular target of the wiper member 161.

The rotary wiping unit 151 includes a shaft 163 (FIGS. 1 and 7) which is perpendicular to the shaft 43 (FIG. 1) and is journalled in bearings secured to a sub-frame 167 that is connected to the frame 39. The shaft 163 is rotated in the direction of the arrow E (FIGS. 7, 8 and 9) six revolutions for each revolution of the turret 23 (FIG. 1) by a chain drive 168 connecting the shaft 163 to the shaft 36.

The wiper member 161 comprises a flat, flexible resilient deflector 169 of rubber or the like having a hooked lower end 171. The deflector 169 is secured to the shaft 163 by a bracket 172 having a hub rigidly secured to the shaft 163. The bracket 172 is formed so that the plane of the deflector 169 makes an acute angle relative to the shaft 163 and is substantially parallel to the rear shaft 84 of the orienting mechanism when that mechanism is in the position shown in FIGS. 7 and 8. The timing of the tail wiper 161 is such that the deflector sweeps laterally across and directly above the rear orienting roller 86, with the hooked portion being disposed closely adjacent the uppermost surfaces of the rear roller 86 and belt 91.

If a pear is properly oriented with its bulbous blossom end in the chamber 110a as indicated in FIG. 7, the deflector 169 of the tail wiper 161 passes the blossom end of the pear without contacting the pear or disturbing its proper orientation. If, however, the pear momentarily comes to rest when it is 180° out of alignment as indicated in FIG. 8, the hooked end of the deflector 169 engages the stem end of the pear, raises it slightly and flips it transversely of the carrier allowing the rollers 86, 96 and 97 and the belt 91 to cooperate to properly orient the pear. It will be recognized that the wiper 161 contacts and flips a pear which is 180° out of alignment immediately after the stability of the pear has been disturbed by the vertical up and down movement of the bridge 105. Thus, the cam 150 and the wiper 161 cooperate to disturb pears, which are 180° out of alignment to aid in its orientation.

Long thin pears sometimes tend to come to rest near the forward end of the orienting mechanism 22 as indicated in FIG. 9. Accordingly, wiper 176 is provided to disturb the stability of such pears. The wiper 176 comprises a resilient strap 177 of rubber or the like which is secured to a tongue 178 welded to a collar 179 that is secured to the shaft 163. The wiper 176 is arranged to extend vertically downwardly at the time the orienting mechanism 22 has moved to a position directly therebelow. When a pear is properly oriented in the aligning cavity 110, the strap 177 merely brushes across the nose of the pear and rolls the pear in the cavity without disturbing its nested position in the cavity 110. If however, a long thin pear comes to rest in the position shown in FIG. 9 with the blossom end near the forward end of the orienting mechanism 22, either in the cavity 110 or above one of the side orienting rollers and with the stem or stem end lightly engaging the belt 91, the following action occurs. The resilient strap 177 causes centering of the blossom end of the pear in the cavity 110 either by sweeping the blossom end of the pear laterally into the cavity or by exerting a downward force against the blossom end of the pear of sufficient magnitude to increase the frictional engagement between the blossom end of the pear and the particular side orienting roller or rollers being contacted by a pear. With a pear in the cavity 110, the additional downward force exerted against the blossom end of the pear by the resilient strap 177 causes increased frictional engagement between the frusto-conical portions 104 of the rollers 96 and 97 to move the pear rearwardly so that the belt 91 and orienting rollers 96 and 97 can then cooperate to complete the orientation of the pear by advancing the blossom end of the pear into the spherical chamber 110a and thereafter rotate the pear to the oriented position.

It will be understood that certain pears have longitudinal ridges in the periphery of their bulbous blossom ends. When a pear with such a ridge is disposed in the aligning cavity 110 with the ridge resting on the nose stop 119 (FIG. 4) a drag is applied to the pear which resists orientation of the pear. In this situation, the resilient strap 177 merely rotates the pear in the cavity 110 a sufficient amount to reduce this drag and increase frictional engagement between the pear and the side orienting rollers 96 and 97 to cause the pear to be moved rearwardly and then to the oriented position as above described. The continuous movement of the orienting mechanism in the direction of the arrow A past the head wiper 176 also aids in the rearward movement of the pear.

It will be understood that the resilience of the strap 177 is such that the strap will not contact the pear with sufficient force to dislodge it from the cavity 110.

As mentioned previously, the transfer mechanism 24 (FIG. 1) is arranged to transfer oriented pears from the several orienting mechanisms 22 individually into the three fruit supporting cups 26 which are intermittently driven and are stopped, one-by-one, at the discharge station D of the transfer mechanism 24. Because the clearance between the transfer mechanism and the cup 26 receiving a pear during the transfer operation is relatively small, the adverse-condition detector 11 of the present invention is provided to detect any abnormality in the position of the cup 26 at the discharge station D or in the position of those parts of the transfer mechanism 24 which swing past the cup 26.

The transfer mechanism 24 is fully described in the Chamberlin application and in general includes the hub 44 (FIGS. 10 and 11) which is keyed to the continuously driven shaft 43, and a Y-shaped support member 186 (FIG. 10) which carries the three fruit-gripping jaw mechanisms 24a of the transfer mechanism. The Y-shaped member includes three elongate plates 186a, 186b and 186c which have end faces welded to an end face of hub 44. The other end of each elongate plate is welded to an enlarged end 187a (FIG. 11) of a stub shaft 187 which is concentric with the shaft 43, extends through a drum cam 188, and is journalled in a bearing 189 (FIG. 1) secured to the frame 39. Since all the fruit gripping jaw mechanisms 24a are identical, the description of one will suffice for all.

Each gripping mechanism 24a (FIGS. 10, 11 and 13) includes a pair of gripping arms 198 and 199 having jaws 198a and 199a which have identical configurations, but oppositely disposed, on their free ends. The arms 198 and 199 are pivotally journalled on pins 201 and 202 (FIG. 11) respectively, which are rigidly secured to the associated mounting plate of the Y-shaped member 186. The arms are retained on their associated pins by snap rings 203. Gear segments 204 are secured to the hubs of the gripping arms 198 and 199 and are in mesh, thereby assuring that both arms will be moved equal amounts in opposite directions. A large diameter gear 207 meshes with one of the gears 204 and is secured to a shaft 209 which extends through the associated mounting plate and is journalled in a hub 211 welded to the associated mounting plate. An actuating arm 212 is keyed to the shaft 209 and carries a cam follower 213 near its free end. A spring 219 is connected between a pin 221 on the arm 199 and a pin 222 on the hub 44, and normally urges the fruit gripping jaws 198a and 199a toward each other. The cam follower 213 rides in a drum cam 188 having a first lobe 226 (FIG. 12) therein which opens the jaws 198a and 199a a sufficient amount to permit the jaws to move past the cup 26 without interference and release a pear stem end down 199a at a precise moment for discharge into the cup 26 at the discharge station D. A second lobe 227 opens the jaws still further preparatory to approaching the next pear to be gripped.

The three fruit supporting cups 26 are mounted on a turret 231, shown diagrammatically in FIG. 3, which is intermittently driven in the general direction indicated by the arrows X (FIG. 3) by internal drive parts (not shown) of the machine 27. Since the three cups 26 are identical, the description of one will suffice for all. The structure for mounting and rotating the cups 26 is fully disclosed in the aforementioned Freeman et al. patent.

Each cup 26 includes a mounting plate 232 (FIGS. 10 and 13) which is pivoted on a bolt 233 which secures the cup to the turret 231 and permits the cup 26 to be pivoted from a position in which its axis is vertical to a position in which its axis is horizontal. The mounting plate 232 includes a gear segment (not shown) that is concentric with the bolt 233 and meshes with a gear segment 236. A cam follower 237 is connected to the gear segment 236 and the segment is journalled on a bolt 238 secured to the turret 231. The cam follower 237 rides in a groove 239 of a fixed cam 241 which groove is arranged to swing the cups 26 so that their axis is vertical at the discharge station D and are horizontal at the other two stations of the turret 231.

The plate 232 carries a pair of upper jaw arms 243 and 244 (FIG. 13) journalled on stub shafts 246 and 247 that are secured to the mounting plate 232 as by welding. Meshing pinions 248 and 249 on the arms 243 and 244, respectively, will assure that the arms will be pivoted equal amounts in opposite directions. Each of two tension springs 251 is connected between one of two pins 252 secured to the plate 232 and one of two pins 253, each pin 253 being secured to one of the arms 243 or 244. The springs 251 urge fruit gripping jaws 243a and 244a formed on the free ends of the arms 243 and 244 toward each other.

A pair of lower jaw arms 256 and 257 are journalled on stub shafts 258 and 259, respectively, and are provided with meshing pinions 261 and 262, respectively, which assure equal and opposite pivoted movement of the arms 256 and 257. Two tension springs 263 are provided and each spring 263 is connected between one of two pins 264 secured to the mounting plate 232 and one of two pins 266, one being secured to each of the lower jaw arms 256 and 257. The springs 263 serve to urge lower jaws 256a and 257a together so as to define a frusto-conical centering chamber 267 when held together.

In order to prevent the spreading of the lower jaws 256a and 257a when the pear is transferred into the cup 26 at station D, a latch arm 268 (FIG. 13) is provided for latching the lower arms 256 and 257 together. The latch arm 268 is pivotally connected to the lower jaw arm 257 by a pin 271 that projects from the arm 257. A locking slot 272 (FIG. 13) in the latch arm 268 is arranged to receive a pin 273, which is secured to the arm 256, to lock the arms 256 and 257 together. A spring 274 is connected between a pin 276 on the latch arm 268 and a pin 277 secured to the arm 257 to normally hold the latch arm 268 in latched position. It is to be understood that the machine 27 includes suitable means for unlatching the lower jaw arms 256 and 257 when it is desired to discharge the pear from its cup 26.

The upper jaws 243a and 244a are positively opened to facilitate feeding of the pear into the latched lower jaws 256a and 257a when each assembly is at the discharge station D. For this purpose, the upper arm 244 of each cup 26 is provided with an extension 278 having a hardened cam plate 279 secured thereto. Each cam plate 279 engages the beveled end of an adjustable cam bar 280 (FIG. 13) shortly before the cup 26 reaches the discharge station D to spread the upper jaws 243a and 244a as shown in FIG. 13. The adjustable cam bars 280 are bolted to the turret 231 adjacent their associated cups 26.

As mentioned previously and as is apparent from a study of FIG. 13, the jaws 198a and 199a of the transfer mechanism 24 must pass between the spaced upper jaws 243a and 244a of the cup 26 at the discharge station D and must move past the outer walls of the lower jaws 256a and 257a.

Accordingly, the adverse-condition detector 11 of the present invention is provided to stop the motor 32 (FIG. 1) in the event the lower jaws 256a and 257a are not latched and accordingly are spaced wider apart than shown in FIG. 13. Also, the detector 11 will stop the motor 32 in the event the fruit gripping transfer jaws 198a and 199a of the transfer mechanism 24 are spread to such an extent that they are apt to engage the upper jaws 243a and 244a.

The adverse-condition detector 11 (FIGS. 10 and 13) comprises a vertically extending mounting plate 281 having a slot 282 in its upper end which receives a stationary shaft 283 upon which the cam 241 is fixed and upon which the turret 231 is journalled. The plate 281 is locked to the cam 241 by a nut 284 screwed on the shaft 283 and a cap screw 286 that extends through a hole in the plate and is screwed into the cam 241. A block 287 is bolted to the plate 281 near a slot 288 therein and carries an upwardly projecting pin 289. A deflector finger 291 is journalled for pivoting movement on the pin 289 and projects through the slot 288 in the plate 281 to a position close to the path of movement of the jaw 199a when the jaws 198a and 199a are separated no greater than the desired extent. A link 293 is pivotally connected between the deflector finger and a split block 294. The split block 294 is clamped by a cap screw 296 to the shaft 297 of a limit switch 298 which is secured to the plate by four cap screws 299. A deflector finger 301 (FIG. 13) is rigidly secured to the split block 294 and has a downwardly projecting extension disposed closely adjacent to the path of movement of lower jaw 256a of each cup as the cup is moved downwardly and to the left (FIG. 13) under control of cam 241 to the station D at which it is in position to receive a pear from the transfer mechanism. If the jaws 256a and 257a are properly clamped together they will not contact the finger 301. One corner of the finger 301 is chamfered as at 302 to permit unobstructed passage of the latch arm 268 when the arm 268 is properly latched. The deflector finger 301 lies in a vertical plane and projects from the shaft 297, past the vertical plate 281, and toward the cup 26 at an angle of approximately 75° to the plane of plate 281 so that an unlatched cup will gently strike the deflector as it moves to station D.

A helical torsion spring 304 is connected at one end to the housing of the limit switch 298 and at the other end to the shaft 297. The torsion spring 304 normally holds the deflectors 291 and 301 in the position shown in FIGS. 12 and 13 and the actuating element 306 (FIG. 14) of the switch 298 in the closed position.

With the actuating element 306 in the closed position, the motor 32 is initially started by actuating a magnetic start switch 307 which establishes a circuit which includes main line L1, the element 306, the motor 32, the start switch 307 and the main line L2. If the deflector 291 is contacted by a jaw 199a of the transfer mechanism 24 the actuating element 306 is moved to the position 306a to open the circuit thereby stopping the motor 32. Similarly, if the lower jaws 256a or 257a are not latched when they approach the discharge station D and the jaw 256a contacts the deflector 301, the element 306 will be moved to the position 306b to open the circiut and stop the motor 32. When the motor 32 stops, the operator first corrects the difficulty and then starts the motor 32 by actuating the start switch 307.

In the operation of the adverse-condition detector 11 of the present invention, the different parts of the fruit preparation machine are placed in operation by closing the magnetic start switch 307 (FIG. 14). Normal operation of the machine continues unless the jaws 198a and 199a are excessively spaced and contact the deflector 291, or unless the lower jaws are not latched so that either the latch arm 268 or the lower jaw 256a contacts the deflector 301.

If the jaws 198a and 199a are excessively spread and contact the deflector 291, the deflector will be pivoted in one direction causing the link 293 and split block 294 to pivot the actuating element 306 of the switch 298 to the position 306a to open the circuit of the motor 32 and stop the machine. The operator then corrects the difficulty, which may be a pear gripped end-to-end or an oversize pear, and restarts the machine by actuating the start switch 307.

If the lower cup jaws 256a and 257a are not latched, either the latch arm 268 or the cup 256a contacts the deflector 301 and pivots the deflector in the opposite direction to move the actuating element 306 of the switch 298 to the position 306b. The latch arm 268 will contact the deflector if, for example, a stem is disposed between the jaws 256a and 257a thereby preventing the latch arm 268 from moving into the latched position. If the jaws 256a or 257a are spaced wider apart by, for example, a soft pear therein, the jaw 256a will contact the deflector 301 to actuate the limit switch 298.

From the foregoing description, it is apparent that the fruit preparation machine includes an adverse condition detector which stops the machine in the event that either the fruit supporting cups are not properly latched or if the jaws of the transfer mechanism are spaced more than a predetermined permissible amount. Also, the machine includes an improved position altering apparatus which is arranged to cooperate with an orienting mechanism to disturb or alter the position of pears which come to rest in an unoriented position prior to the completion of travel of the orienting mechanism thereby permitting the orienting mechanism to subsequently orient the pear.

While one embodiment of the present invention has been shown and described, it will be understood that various changes and modifications may be made without departing from the spirit of the invention or the scope of the appended claims.

The invention having thus been described what is believed to be new and desired to be protected by Letters Patent is:

1. In a pear orienting apparatus, orienting means for supporting a pear and rotating the pear about a plurality of axes to orient the pear with its stem end projecting in a predetermined direction and with its stem blossom axis disposed in a predetermined plane, resilient means movable across said orienting means transversely of said predetermined plane for engaging an unoriented pear on said orienting means and urging it from the unoriented position to aid in the orientation of said pear, and drive means for moving said resilient means transversely across said orienting means.

2. In a pear orienting apparatus, orienting means for supporting a pear and rotating the pear about a plurality of axes to orient the pear with its stem end projecting in a predetermined direction and with its stem blossom axis disposed in a predetermined plane, said orienting means being shaped to define a pear alignment cavity having a longitudinal axis parallel to said predetermined plane, a bridge in said cavity for partially supporting the pear in said orienting means, means mounting said bridge for vertical movement in said cavity, a cam mounted in position to abruptly actuate said bridge to raise and lower said bridge and jostle the pear, first drive means for imparting relative motion between said cam and said bridge mounting means to raise and lower said bridge, resilient means movable transversely of said predetermined plane across said orienting means to engage and jostle an unoriented pear on said orienting means to aid in the orientation of said pear, and second drive means timed with said first drive means for actuating said resilient means immediately after the pear has been jostled by said bridge.

3. In a pear orienting apparatus, orienting means for supporting a pear and rotating the pear about a plurality of axes to orient the pear with its stem end projecting in a predetermined direction and with its stem blossom axis disposed in a predetermined plane, means for moving said orienting means along a predetermined path, resilient means movable transversely of said predetermined path to engage and jostle an unoriented pear on said orienting means to aid in the orientation of said pear, and drive means for actuating said resilient means in timed relation with the movement of said orienting means along said predetermined path.

4. In a pear orienting apparatus, orienting means for supporting a pear and rotating the pear about a plurality of axes to orient the pear with its stem end projecting in a predetermined direction and with its stem blossom axis disposed in a predetermined plane, said orienting means being shaped to define a pear alignment cavity therein, a bridge in said cavity for partially supporting the pear in said orienting means, means carried by said orienting means for mounting said bridge for vertical movement in said cavity, means for moving said orienting means along a predetermined path, a stationary cam mounted in the path of movement of said mounting means for abruptly actuating said mounting means for raising and lowering said bridge and the pear partially supported whereby to jostle the pear and aid in its orientation, resilient means movable transversely of said predetermined path to engage and jostle an unoriented pear on said orienting means to aid in the orientation of said pear, and drive means for actuating said resilient means immediately after said pear has been jostled by said bridge.

5. In a pear orienting apparatus, orienting means for supporting a pear and rotating the pear about a plurality of axes to orient the pear with its stem end projecting in a predetermined direction and its stem blossom axis disposed in a predetermined plane, said orienting means having a continuously driven roller with its axis of rotation extending transversely of said plane and being disposed adjacent the blossom end of a properly oriented pear, means for moving said orienting means along a predetermined path, a rotatable shaft disposed above said path and being substantially parallel to said plane when said orienting means is passing thereunder, a flat resilient deflector having a hooked lower end carried by said shaft and rotatable therewith, and drive means for rotating said shaft in timed relation with the movement of said orienting means for causing said hooked end to sweep laterally across said orienting means over said roller for engaging and transversely flipping the stem end of a pear which projects over said roller to aid in orienting said pear.

6. In a pear orienting apparatus, orienting means for supporting a pear and rotating the pear about a plurality of axes to orient the pear with its stem end projecting in a predetermined direction and its stem blossom axis disposed in a predetermined plane, said orienting means having a pair of rollers driven in opposite directions with their adjacent surface moving downwardly, said rollers being arranged to frictionally engage a pear supported therebetween and move the pear relative to said rollers in a direction opposite to said predetermined direction, means for moving said orienting means along a predetermined path, a rotatable shaft disposed above said path and substantially parallel to said plane when said orienting means is passing thereunder, a resilient strap carried by said shaft and rotatable therewith, and drive means for rotating said shaft in timed relation with the movement of said orienting means for causing said strap to sweep laterally of said plane across said orienting means over said rollers for rolling and urging the blossom end of an unoriented pear into firm frictional engagement with said rollers to aid in orienting said pear.

7. In a pear orienting apparatus, a plurality of orienting means, each orienting means including means for supporting a pear and rotating the pear about a plurality of axes to orient the pear with its stem end projecting in a predetermined direction and with its axis disposed in a predetermined plane relative to the associated orienting means, means for moving said plurality of orienting means along a predetermined path, first resilient means movable transversely of said predetermined path to engage the stem end of a first unoriented pear carried by one of said orienting means for flipping the stem end of said first pear laterally of said path to aid in the orientation of said first unoriented pear, second resilient means movable transversely of said predetermined path to engage the blossom end of a second unoriented pear carried by another of said orienting means to roll said second unoriented pear transversely of said path and to urge said pear firmly against said other orienting means to aid in the alignment of said second pear, and drive means for actuating said first and second resilient means in timed relation with the movement of said plurality of orienting means along said predetermined path.

8. In a pear orienting apparatus, a plurality of orienting means for orienting individual pears with their stem ends projecting in a predetermined direction relative to their associated orienting means and with their stem blossom axes each lying in a plane extending longitudinally of the associated orienting means, each orienting means including a continuously driven roller extending transversely of said plane and a pair of rollers disposed one on each side of said plane and driven so that their adjacent surfaces move toward each other and downwardly, said rollers of said orienting means being spaced from each other to define an alignment cavity therebetween with said transverse roller being disposed at one end of said cavity and adjacent the blossom end of a properly oriented pear in the cavity, means for moving said plurality of orienting means along a predetermined path, a rotatable shaft disposed above said path substantially parallel to the longitudinal planes of the orienting means when the orienting means are passing thereunder, a flat resilient deflector having a hooked lower end carried by said shaft and projecting outwardly therefrom in one direction, a resilient strap carried by said shaft at a point spaced from said deflector and projecting outwardly from said shaft in another direction, and drive means for rotating said shaft in timed relation with the movement of said plurality of orienting means for first causing said hooked end to sweep laterally across one of said orienting means over said transversely extending roller for engaging and transversely flipping the stem end of a first unoriented pear to aid in orienting said first pear, continued rotation of said drive means causing said resilient strap to sweep laterally across a second orienting means over said pair of rollers for rolling and urging the blossom end of a second unoriented pear into firm frictional engagement with said pair of rollers of said second orienting means to aid in orienting said second pear.

9. In a pear orienting apparatus, a plurality of orienting means defining an elongate cavity and arranged for orienting individual pears with their stem ends projecting in a predetermined direction relative to said cavity and with their stem blossom axes each lying in a plane extending longitudinally of said elongate cavity, each orienting means including a continuously driven roller extending transversely of said plane and a pair of rollers disposed on opposite sides of said plane and driven so that their adjacent surfaces move toward each other and downwardly, said rollers of each orienting means being spaced from each other to define said alignment cavity therebetween with said transverse roller being disposed adjacent the blossom end of a properly oriented pear in the cavity, means for moving said plurality of orienting means along a predetermined path, a bridge in said alignment cavity of each orienting means for partially supporting the pear in that orienting means, mounting means pivotally connecting each bridge to the associated orienting means for vertical pivotal movement in said cavity, a fixed cam mounted in position to be engaged by each mounting means in turn to abruptly raise and lower said bridges and jostle the pears carried thereby, a rotatable shaft disposed above said path and being substantially parallel to the longitudinal planes of the orienting means when the orienting means are passing thereunder, a flat resilient deflector having a hooked lower end carried by said shaft and projecting outwardly therefrom in one direction, a resilient strap carried by said shaft at a point spaced from said deflector and projecting outwardly from said shaft in another direction, and drive means for rotating said shaft in timed relation to the movement of said plurality of orienting means for first causing said hooked end to sweep laterally across one of said orienting means over said transversely extending roller for engaging and transversely flipping the stem end of a first unoriented pear immediately after said first pear has been jostled by actuation of said bridge to aid in orienting said first pear, continued rotation of said drive means causing said resilient strap to sweep laterally across a second orienting means over said pair of rollers for rolling the blossom end of a second unoriented pear and urging the pear into firm frictional engagement with said pair of rollers of said second orienting means to aid in orienting said second pear.

10. In a pear orienting apparatus, orienting means, a plurality of pear engaging means in said orienting means adapted to partially support a pear and defining a pear aligning cavity therebetween, means connected to said pear engaging means for driving said pear engaging means in directions which will cause the stem end of the pear to project in a predetermined direction and will cause the pear to become oriented with its stem blossom axis disposed in a predetermined plane, a bridge in said aligning cavity for partially supporting a pear therein, means mounting said bridge for vertical movement, a cam for abruptly actuating said mounting means for raising and lowering said bridge and the pear partially supported thereby to jostle the pear and aid in its orientation, and means for imparting relative motion between said cam and said mounting means.

11. In a pear orienting apparatus, an orienting means, means for moving said orienting means along a predetermined path, a plurality of pear engaging means in said orienting means for partially supporting a pear and defining a pear aligning cavity therebetween, means connected to said pear engaging means for driving said pear engaging means in directions which will cause the stem end of the pear to project in a predetermined direction and will cause the pear to become oriented with its stem blossom axis disposed in a predetermined plane, a bridge in said aligning cavity for partially supporting a pear thereon, means mounting said bridge for vertical movement, and a stationary cam mounted in the path of movement of said mounting means for raising and lowering said bridge and the pear partially supported thereon to jostle the pear and aid in its orientation.

12. In a pear orienting apparatus, orienting means, means for moving said orienting means along a predetermined path, a plurality of rollers journalled in triangular configuration in said orienting means, an upwardly inclined belt trained around one of said rollers and defining with said rollers a pear receiving cavity, driven means connected to said rollers for driving the same and said belt in directions which will cause a pear partially supported by said rollers and said belt to become oriented with its stem end projecting in a predetermined direction and with its stem blossom axis disposed in a predetermined plane, a bridge in said aligning cavity for partially supporting a pear thereon, means carried by said orienting means for mounting said bridge for vertical movement, and a stationary cam mounted in the path of movement of said mounting means for abruptly actuating said mounting means for raising and lowering said bridge and the pear partially supported thereon to jostle the pear and aid in its orientation.

13. In a pear orienting apparatus, orienting means, means for moving said orienting means along a predetermined path, said orienting means including a plurality of rollers journalled in triangular configuration, one of said rollers extending transversely of said predetermined path, an upwardly inclined belt trained around said one roller and defining with said rollers a pear receiving cavity, drive means connected to said rollers for driving the same and said belt in directions which will cause a pear partially supported by said rollers and said belt to become oriented with its stem blossom axis disposed in a predetermined plane and its stem end spaced from said transversely extending rollers, a bridge mounted on said orienting means and disposed in said cavity for partially supporting the pear, a shaft journalled above the path of movement of said orienting mechanism, a flat resilient deflector carried by said shaft and projecting radially outward from said shaft, and means connected to said shaft for rotating said shaft in timed relation with the movement of the orienting means along said predetermined path to swing said resilient deflector transversely across said orienting means above said transversely extending roller and into engagement with the stem end of a pear which avoids orientation by having its stem end positioned over said transversely extending roller.

References Cited by the Examiner
UNITED STATES PATENTS

| | | |
|---|---|---|
| 1,835,570 | 12/31 | Lorenz. |
| 1,835,579 | 12/31 | Westin. |
| 2,283,615 | 5/42 | Skinner _____ 198—25 |
| 2,907,440 | 10/59 | Hait. |
| 2,980,233 | 4/61 | Puccinelli. |

SAMUEL F. COLEMAN, *Primary Examiner.*

EDWARD A. SROKA, *Examiner.*